United States Patent [19]
Di Piazza et al.

[11] 3,775,765
[45] Nov. 27, 1973

[54] SYSTEM FOR RESOLVING THE SIZES AND CENTROID LOCATIONS OF BURIED OBJECTS

[75] Inventors: Gerald Charles Di Piazza, Randolph Twp., Morris Cty.; Peter Onno, Denville; Henry Oswald, Mendham; Clifford Warren Schaible, Morristown, all of N.J.

[73] Assignee: Bell Telephone Laboratories, Incorporated, Berkeley Heights, N.J.

[22] Filed: Dec. 8, 1971

[21] Appl. No.: 205,937

[52] U.S. Cl............. 343/5 R, 181/0.5 EC, 343/7 A
[51] Int. Cl................................................. G01s 9/02
[58] Field of Search................... 343/5 R, 7 A; 181/0.5 EC

[56] References Cited
UNITED STATES PATENTS

| | | | |
|---|---|---|---|
| 3,392,384 | 7/1968 | Wesch | 343/5 R |
| 2,754,492 | 7/1956 | Parker | 343/5 R X |
| 2,661,466 | 12/1953 | Barret | 343/5 R |
| 2,201,256 | 5/1940 | Barret | 343/5 R X |
| 2,139,460 | 12/1938 | Potapenko | 343/5 R |
| 3,208,545 | 9/1965 | Doty et al. | 181/0.5 EC |
| 3,092,828 | 6/1963 | Allen | 343/5 R |

*Primary Examiner*—Malcolm F. Hubler
*Attorney*—W. L. Keefauver

[57] ABSTRACT

A broadband, radar-type system for resolving the sizes and centroid locations of objects buried at a maximum depth in the order of 6 to 10 feet is disclosed. The system uses a carrier frequency which is high enough so that an instantaneous bandwidth of about 25 percent provides resolution in the order of 1 foot. The system antenna includes impedance matching and focusing means. Polarization diversity of the transmitted beam may be accomplished to distinguish between elongated and generally round objects.

4 Claims, 1 Drawing Figure

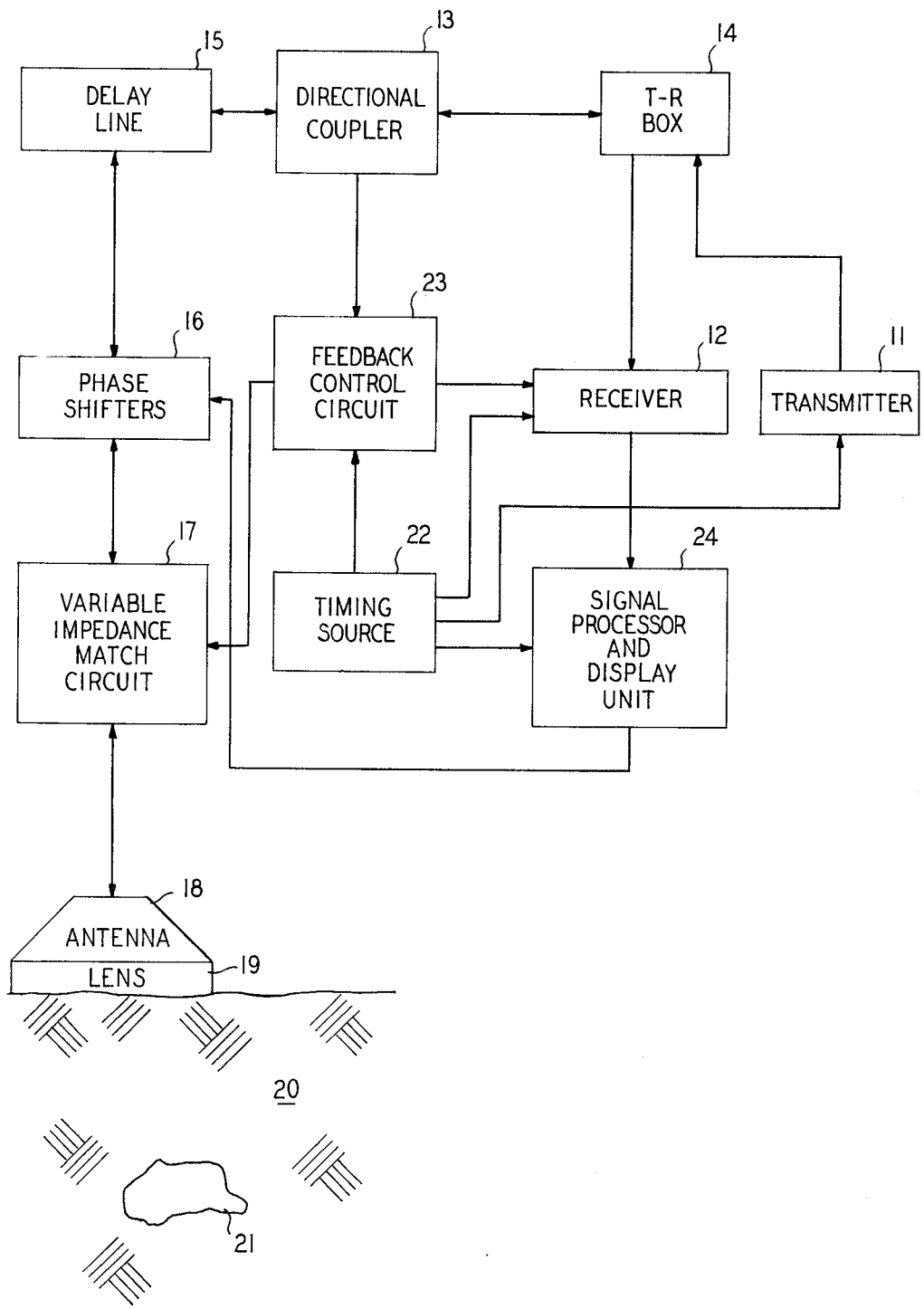

SYSTEM FOR RESOLVING THE SIZES AND CENTROID LOCATIONS OF BURIED OBJECTS

BACKGROUND OF THE INVENTION

1. Field of the Invention

This invention relates to the detection of underground objects, including voids.

2. Description of the Prior Art

The amount of excavating and underground boring has increased in recent years. There is an increasing tendency, for example, for utility companies to provide telephone, electrical, and other services by underground conduits. Customers frequently desire buried conduits because services provided otherwise often detract from the landscape. The utility companies, on the other hand, prefer underground conduits because they are less subject to damage. Finally, new techniques — such as the subterranean missile or "mole" described in J. C. Coyne U.S. Pat. No. 3,589,454 — have been developed which not only permit rapid burial of different types of conduits but effect the burial with relatively little defacing of existing surface conditions.

A prime consideration in any excavating or boring technique is knowledge with respect to the locations and sizes of underground objects. Such knowledge enables an excavator to proceed at a more rapid pace. Furthermore, such knowledge offers a better chance to select a successful path for an underground boring device. Unfortunately, this information is often unavailable. Furthermore, underground object detection techniques found in the prior art appear to lack the necessary resolving power for this application.

SUMMARY OF THE PRESENT INVENTION

An object of the present invention is to resolve, from the surface of the earth, the sizes and centroid locations of objects which are at relatively short depths below the earth's surface. The maximum depths contemplated may be in the order of 6 to 10 feet.

This and other objects are achieved by embodiments of the invention which take the form of radar-type systems. These embodiments transmit relatively broadband radar-type pulses of carrier frequency energy into the portion of the earth to be interrogated. When this energy encounters dielectric discontinuities, a portion of the energy is reflected back to the embodiment as in a conventional radar system. However, unlike conventional radar systems, an antenna structure in each embodiment of the present invention includes a lens which both coarsely matches the antenna to the earth and focuses the energy into that portion being interrogated. In addition, a variable impedance matching circuit is associated with each antenna structure. This circuit is controlled by a feedback path to fine tune, over a broad bandwidth, the match between the antenna structure and the rest of the system. This feedback path also operates to disable the receiver when large returns are received because of momentary impedance mismatches.

In further accordance with the invention a delay line is used to introduce sufficient delay to permit the transmitter to complete transmission before return energy arrives at the receiver. This feature accommodates for the relative closeness of the target to the antenna structure.

The broadband characteristic mentioned above permits size and centroid location resolution of the desired order of magnitude — as, for example, in the order of one foot. The carrier frequency required to achieve such a bandwidth is in the order of 1 to 2 GHz. This high frequency results in high attenuation within the earth's soil. A particular advantage of the invention is that this reduces ambiguities produced by reflections from objects at depths greater than those of interest.

In the previous paragraph, the high attenuation of the r.f. energy within the soil and the advantage thereof were discussed. This attenuation increases with carrier frequency, and, at first glance, would appear troublesome when embodiments of the invention may be operated at more than one carrier frequency. Fortuitously, the broadband characteristic of the system causes the gain of the antenna structure within the frequency range of interest to increase with an increase in the carrier frequency. This tends to compensate for the increased attenuation of the energy in the soil with the result that round-trip loss over a band of carrier frequencies remains relatively constant.

Another feature of the invention is the option of using orthogonal wave launchers in the antenna. With the use of these launchers, a rotating fanshaped beam is transmitted into the soil. Returns from this beam permit the operator to distinguish between elongated objects and more or less round objects. Conduits and other man-made elongated objects are therefore readily distinguishable one from the other.

These and other objects and features of the invention will become more apparent from a study of the following detailed description of an embodiment of the invention.

BRIEF DESCRIPTION OF THE DRAWING

The drawing is a block diagram depicting an embodiment of the invention.

DESCRIPTION OF THE DISCLOSED EMBODIMENT

The embodiment illustrated in the drawing includes a broadband, radar-type transmitter 11 and a companion receiver 12. Transmitter 11 and receiver 12 are alternately connected to a directional coupler 13 by a T-R (transmit-receive) box 14. A delay line 15, phase shifters 16, and a variable impedance match circuit 17 are connected in series in that order between directional coupler 13 and an antenna 18 so as to be between the antenna and the surface of soil 20. The antenna and lens combination is movable over the surface of soil 20. Located in the soil 20 is a rock 21.

In operation, pulsed energy from transmitter 11 passes by way of the path comprising T-R box 14, directional coupler 13, delay line 15, phase shifters 16, match circuit 17, antenna 18, and lens 19 into soil 20. Some of this energy is reflected by rock 21 and travels back through the path to receiver 12.

A timing source 22 controls the operations of transmitter 11 and receiver 12 so that they transmit and receive alternately. It also times the operation of a feedback control circuit 23 which is connected between directional coupler 13 and both variable impedance match circuit 17 and receiver 12. In operation, control circuit 23 controls match circuit 17 to optimize matching; that is, it operates to maximize the output of directional coupler 13 during the receiving operation and/or to minimize the output during the transmitting operation. It also operates to protect receiver 12 from high energy returns. In receiver 12, for example, it may control an electronic variable attenuator of the type disclosed in J. V. Anders et al. U.S. Pat. No. 3,289,120.

Timing source 22 also controls a signal processor and display unit 24. An output from this unit is applied to phase shifters 16 to control the polarization diversity of the transmitted energy. In particular, it controls the energy applied to orthogonal wave launchers in antenna 18 so that a rotating fanshaped beam of energy is transmitted into soil 20. The signal processor and display unit 24 relates the return from this beam to the rotational direction of the beam, whereby elongated and generally round objects are distinguished from one another. This feature is, of course, not required if distinguishing between such objects is not required.

Transmitter 11 is of conventional design. To detect underground conduits, septic tanks, rocks, and other objects, it provides a burst of carrier frequency energy having a bandwidth which permits resolution of target size and centroid location in the order of 1 foot. The carrier frequency is therefore high enough to permit this order of resolution at an operational instantaneous percentage bandwidth in the order of 25–30 percent. The bandwidth may be as narrow at 150 MHz and, in some instances, as wide as 500 MHz. If it is economically feasible, the system may permit signal transmission whose effective bandwidths can be varied from 150 MHz through 500 MHz. A typical carrier frequency under these conditions is therefore between 1 and 2 GHz.

Receiver 12, T-R box 14, and coupler 13 are also conventional units. Directional coupler 13 is oriented to direct a portion of the received energy into feedback control circuit 23. This circuit comprises a power detector whose output is compared with a reference voltage with the difference voltage used to drive variable impedance match circuit 17 in a sense to maximize the the power level. The variable impedance match circuit 17 may comprise parallel and series connected varactor diodes whose characteristics are controlled by the difference voltage.

Delay line 15 plays an important function in the system in that it introduces a delay sufficiently long to enable transmitter 11 to complete transmission before any of the returned energy reaches directional coupler 13. In particular, it causes the transmission time from transmitter 11 to antenna 18 to receiver 12 to equal a period at least equal to the duration of the pulse modulated carrier wave produced by transmitter 11. Although the delay line is conventional, it is not — to the best of applicants' knowledge — used in this manner in conventional radar systems. In particular, the present line accommodates for the close proximity of the present transmitting-receiving antenna to its closest target. It should be noted that the line may be placed between the T-R box and the receiver. When so placed, it would not be subjected to high power levels but would have to provide twice the delay time because it is not in a path common to both the transmitter and receiver.

Antenna 18 may comprise a horn antenna having a round aperture and a pair of orthogonally positioned wave launchers. Phase shifters 16 provide phased energy to these launchers. These shifters may take the form of those disclosed in G. C. Di Piazza U.S. Pat. No. 3,546,636. The use of such shifters and launchers to transmit polarized waves is well known to those skilled in the art. As mentioned earlier, the object in transmitting such waves is to distinguish between targets which are more or less symmetrical and those which are more or less elongated. This enables an operator to distinguish between rocks (which are somewhat symmetrical) and pipes and other conduits.

Lens 19 functions to provide both a coarse match and a focusing action between antenna 18 and soil 20. It may comprise a multilayer sandwich of dielectric materials to give a rough initial match. A container filled with a low loss fluid having a compatible dielectric constant may form part of the lens to better conform to the surface of soil 20. Another lens system which may be used is disclosed in L. Wesch U.S. Pat. No. 3,392,384. This system uses a large plurality of dielectric filaments which extend between the antenna and the ground surface.

Signal processor and display unit 24 may take any one of a number of conventional forms depending upon the manner in which the output is to be displayed. The output may, for example, be displayed on a cathode ray tube. On the other hand, it may be recorded by either charting or printing apparatus. Such techniques and others, with their advantages and disadvantages, are well known to those in the radar field.

What is claimed is:

1. Apparatus for detecting an object below the surface of the earth, said apparatus comprising
    a transmitter for generating a pulse modulated carrier wave,
    a receiver,
    an antenna assembly movable over said surface of said earth and having an output impedance approximately equal to that of said surface,
    an electrically controlled impedance matching means connected to said antenna assembly, and
    means for alternately connecting said transmitter and said receiver to said impedance matching means,
    said last-mentioned means comprising
    feedback control means responsive to energy through said last-mentioned means to control said impedance matching means to optimize the impedance match between said antenna assembly and said mean for connecting, and
    delay means to cause the transmission time from said transmitter to said antenna assembly to said receiver to equal a period at least equal to the duration of said pulse modulated carrier wave produced by said transmitter.

2. Apparatus in accordance with claim 1 in which said feedback control means is further connected to said receiver to protect said receiver during periods when received signals exceed predetermined levels.

3. Apparatus in accordance with claim 1 in which said antenna assembly includes dielectric means conformable to said surface of said earth.

4. Apparatus in accordance with claim 3 in which said feedback control means is further connected to said receiver to protect said receiver during periods when received signals exceed predetermined levels.

* * * * *